J. A. Peabody,
Mortising Machine.

Nº 81,286. Patented Aug. 18, 1868

Witnesses
Isaac R. Oakford
Henry P. Coillig

Inventor
Joseph A. Peabody
per Charles H. Evans
Atty

United States Patent Office.

JOSEPH A. PEABODY, OF PHILADELPHIA, PENNSYLVANIA.

Letters Patent No. 81,286, dated August 18, 1868.

IMPROVEMENT IN MORTISING-MACHINES.

The Schedule referred to in these Letters Patent and making part of the same.

TO ALL WHOM IT MAY CONCERN:

Be it known that I, JOSEPH A. PEABODY, of the city of Philadelphia, county of Philadelphia, and State of Pennsylvania, have invented a new and useful Improvement in Mortising-Machines; and I do hereby declare that the following is a full, clear, and exact description of the construction and operation of the same, reference being had to the accompanying drawings, making a part of this specification, in which—

Figure 1:
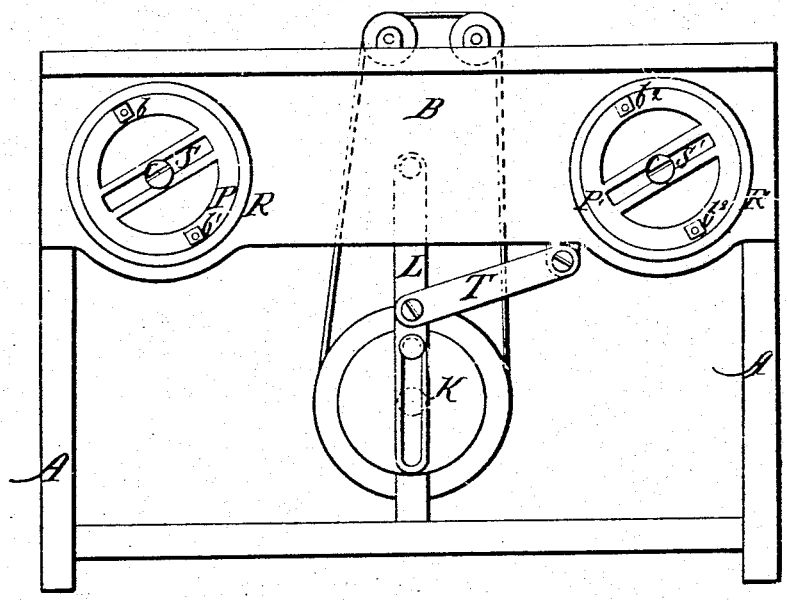
Figure 2:
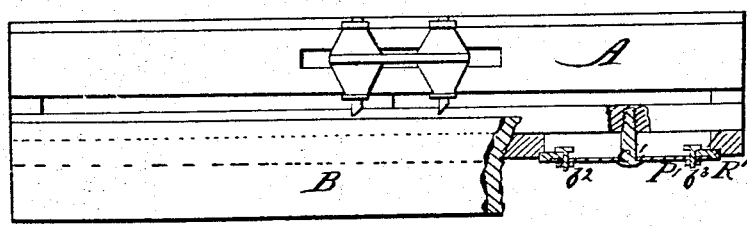

Figure 1 is a side elevation.
Figure 2 is a top view of same.

This is an improvement on the mortising-machine patented by me, July 17, 1855, in which a swinging bar, N, is applied to the front of the frame A A, and is kept in position sidewise by the stands $A^2 A^2$, and is allowed to swing up and down on the arms O. These arms have several holes formed in them, to adjust the movement of the bar N, so as to give any angle to the mortise. By this arrangement the bar N cannot be raised or lowered on a vertical line, neither can it be moved on a horizontal line.

The object of the present improvement is to dispense with the bar N and lever for operating the same, and substitute a movable table, and in place of the arms O, regulators, arranged and operating as hereinafter described, so that I am enabled to render my mortising-machine self-operating.

To enable others skilled in the art to make and use my invention, I will now proceed to describe its construction and operation.

I construct, on the side of the frame A of my mortising-machine, a movable table, B, with a flat top. On the side of said table, and near the ends, are cut circular openings, provided with an offset or flange, in which are placed metallic rings R and R', the insides of which are made with flanges, as shown in fig. 2. The rings R and R' are secured in the openings by means of pins passing through the sides. Fitting in and resting on the flanges of the rings R and R', are circular plates P and P', said plates being made with rectangular slots S and S', in the centre. On the outer edge of the plates are made square or round openings, in which are inserted bolts $b$, $b^1$, $b^2$, and $b^3$, the heads of which catch on the under side of the flanges of rings R and R', and the opposite ends project out through the plates P and P', and are provided with nuts or thumb-screws, passing through the rectangular slots S and S'; and secured to the side of the frame, are long screws C and C'. On each side of the rectangular slots S and S' are made openings, of any desired form, for the purpose of turning the plates in the direction desired.

The operation of my invention is as follows:

I connect, to the crank-pin of the crank, K, a rod or lever, L, provided with a slot, (of sufficient length to suit the throw of the crank,) in which the crank-pin works. The upper end of the rod or lever L has its fulcrum secured to the side of the frame A. The table B is connected to the rod or lever L by means of the rod T, so that when power is applied to the crank, K, motion will be communicated to the table, and move it in the direction according to the adjustment of the regulators.

The material to be mortised is placed on and secured to the top of the table B. Now, if it is desired to make a right or left-hand mortise on a certain angle, the set-screws $b$, $b^1$, $b^2$, and $b^3$, of the regulators are slacked up, and the plates P and P' are turned around until the centre slots S and S' assume the position required; the set-screws $b$ $b^1$ $b^2$ $b^3$ are now tightened up, and thus holding the plates P and P' in a firm position in the rings R and R'. When motion is given to the table B, it will be guided on the stationary screws C and C', in whatever direction the regulators may be placed.

In order to make a long mortise, the regulators are turned until the centre slots S and S' assume a horizontal position, so that when motion is given to the table B, it will move in a direction parallel to the frame A. The table B may also be moved on a vertical line by disconnecting the rod T, and connecting the centre of the table B, at the lower edge, to the crank-pin by means of a short rod. In this case the centre slots S and S' of the regulators must be placed in a vertical position.

Having thus described my invention, its construction and operation, what I claim, and desire to secure by Letters Patent, is—

The regulators, composed of rings R and R', plates P and P', with slots S and S', bolts $b$, $b^1$, $b^2$, and $b^3$, screws C and C', substantially in the manner and for the purpose specified.

JOSEPH A. PEABODY.

Witnesses:
 ISAAC R. OAKFORD,
 CHARLES H. EVANS.